US011381495B2

(12) United States Patent
Hwang et al.

(10) Patent No.: US 11,381,495 B2
(45) Date of Patent: Jul. 5, 2022

(54) SYSTEMS AND METHODS FOR NET NEUTRALITY TESTING

(71) Applicant: ASSIA SPE, LLC, Wilmington, DE (US)

(72) Inventors: Chan-Soo Hwang, Sunnyvale, CA (US); John M. Cioffi, Atherton, CA (US); Tuncay Cil, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 16/937,566

(22) PCT Filed: Jan. 24, 2019

(86) PCT No.: PCT/US2019/014962
§ 371 (c)(1),
(2) Date: Jul. 23, 2020

(87) PCT Pub. No.: WO2019/152251
PCT Pub. Date: Aug. 8, 2019

(65) Prior Publication Data
US 2021/0218660 A1      Jul. 15, 2021

Related U.S. Application Data

(60) Provisional application No. 62/624,467, filed on Jan. 31, 2018.

(51) Int. Cl.
*H04L 43/50* (2022.01)
*H04L 41/142* (2022.01)
(Continued)

(52) U.S. Cl.
CPC ............ *H04L 43/50* (2013.01); *H04L 41/142* (2013.01); *H04L 43/0817* (2013.01); *H04L 43/0852* (2013.01); *H04L 43/16* (2013.01)

(58) Field of Classification Search
CPC . H04L 43/50; H04L 43/0817; H04L 43/0852; H04L 43/16; H04L 41/42
See application file for complete search history.

(56) References Cited

U.S. PATENT DOCUMENTS

2005/0125532 A1\* 6/2005 Kimchi ................... H04L 29/06
709/225
2013/0058221 A1\* 3/2013 Andersen ............ H04L 41/0631
370/242
(Continued)

FOREIGN PATENT DOCUMENTS

WO      2012095193 A1     7/2012

OTHER PUBLICATIONS

Partha Kanuparthy, DiffProbe: Detecting ISP Service Discrimination, 2010 IEEE INFOCOM (Year: 2010).\*
(Continued)

*Primary Examiner* — Michael A Keller
*Assistant Examiner* — Jsing Forng Lin
(74) *Attorney, Agent, or Firm* — North Weber & Baugh LLP; Michael North

(57) ABSTRACT

Described herein are systems and methods that may determine a net neutrality status. Server and agent of an internet network may each generate two flows of data that are transmitted/received by the server/agent, respectively. The first flow comprises an unspoofed data flow as may be transmitted over the network based on an HTTP GET command. The second flow may comprise a spoofed data flow. The second flow may emulate, or spoof, a video stream or other data flows that may be altered in the network. Server or agent may compare the first flow relative to the second flow to determine differences in performance data, from which a net neutrality status can be detected. Generally, after a measurement command is invoked, the system starts a downstream measurement. Then after completion of the
(Continued)

| Function | Vulnerability | Filtering scheme |
|---|---|---|
| DNS look-up | Get IP address from URL | DNS is in plain text and redirected. | DNS redirection & spoofing |
| IP routing | Find route to IP address | Routing table within AS can be overridden by authority. | Block access to certain IP |
| TCP flow | Establish connection | TCP SYN/RST are in plain text and spoofed. Packet loss can trigger rate adjustment. Port # is associated with service types. | Block port Inject TCP RST Traffic shaping & policing |
| SSL/TLS | Secure connection | TLS hello is in plain text. SNI field has destination address. Hello can be profiled. | Detect destination using SNI field |
| HTTP GET | Request service | HTTP has host, type fields in plain text. | Detect service type & host from HTTP |
| App Server | Provide the contents | The search logic can be manipulated. | Block keywords Block links to contents |
| Adaptive code | Adjust service rate | Flow control can trick adaptive code to lower the service rate. | Inject packet losses for video connection | downstream measurement, the system starts an upstream measurement.

18 Claims, 8 Drawing Sheets

(51) Int. Cl.
  *H04L 43/0817* (2022.01)
  *H04L 43/0852* (2022.01)
  *H04L 43/16* (2022.01)

(56) References Cited

U.S. PATENT DOCUMENTS

| | | | | |
|---|---|---|---|---|
| 2016/0286526 | A1* | 9/2016 | Shirazi | H04W 4/12 |
| 2016/0359709 | A1* | 12/2016 | Deen | G06F 16/162 |
| 2017/0230323 | A1* | 8/2017 | Jakobsson | H04L 63/1433 |
| 2018/0115469 | A1* | 4/2018 | Erickson | H04L 41/12 |
| 2018/0351808 | A1* | 12/2018 | Das | H04W 24/02 |
| 2019/0179031 | A1* | 6/2019 | Broumandan | G01S 19/47 |
| 2019/0230010 | A1* | 7/2019 | Guo | H04L 43/04 |
| 2019/0253318 | A1* | 8/2019 | Leng | H04L 12/46 |

OTHER PUBLICATIONS

Examination Report No. 1 dated Feb. 23, 2021 in related Australian patent application No. 2019213577, (4 pgs).
Transmittal of the International Search Report and Written Opinion of the International Search Authority in the PCT application No. PCT/US2019/014962 filed on Jan. 24, 2019, dated Jun. 13, 2019, (16 pgs).
International Preliminary Report on Patentability in the PCT application No. PCT/US2019/014962 filed on Jan. 24, 2019, dated Aug. 4, 2020, (10 pgs).
Partha Kanuparthy, "DiffProbe: Detecting ISP Service Discrimination", School of Computer Science, Georgia Institute of Technology, available from the Internet, <URL:https://www.cc.gatech.edu/people/home/dovrolis/Papers/final-diffprobe-infocom10.pdf> (9 pgs).
Ying Zhang, "Detecting Traffic Differentiation in Backbone ISPs with NetPolice", available from the Internet, <URL:https://web.eecs.umich.edu/~zmao/Papers/netpolice.pdf>, (13 pgs).
Kakhki et al. "Identifying Traffic Differentiation in Mobile Networks", available from the Internet, <URL:https://conferences2.sigcomm.org/imc/2015/papers/p239.pdf> (13 pgs).
Response to examination report dated Aug. 11, 2021, filed on Dec. 10, 2021, in Canadian patent application No. 3090091, (11 pgs).
Korean office action dated Dec. 16, 2021 in Korean patent application No. 10-2020-7022043, (19 pgs).
Chilean office action dated Dec. 1, 2021 in Chilean patent application No. 1995-2020, (3 pgs).
Chilean office action response filed Dec. 9, 2021 in Chilean patent application No. 1995-2020, (5 pgs).
Canadian Office Action dated Aug. 11, 2021 in related Canadian patent application No. 3,090,091, (6 pgs).
Canadian Office Action Response filed Nov. 11, 2021 in related Canadian patent application No. 3,090,091, (5 pgs).
Kanuparthy et al: "Diff Probe: Detecting ISP Service Discrimination", INFOCOM, 2010 Proceedings IEEE, IEEE, Piscataway, NJ, USA, Mar. 14, 2010 (Mar. 14, 2010), pp. 1-9.
Korean Office Action Response filed Feb. 3, 2022 in related Korean patent application No. 10-2020-7022043, (2 pgs).
Australian Office Action Response filed Jan. 11, 2022 in related Australian patent application No. 2019213577, (48 pgs).
Notice of Allowance dated Feb. 9, 2022 in related Australian patent application No. 2019213577, (3 pgs).
Office action dated Apr. 8, 2022 in related Chilean patent application No. 1995-2020, (2 pgs).
Office action response filed May 31, 2022 in related Chilean patent application No. 1995-2020, (2 pgs).

\* cited by examiner

140 Anatomy of traffic filtering: Timelines

| | Function | Vulnerability | Filtering scheme |
|---|---|---|---|
| DNS look-up | Get IP address from URL | DNS is in plain text and redirected. | DNS redirection & spoofing |
| IP routing | Find route to IP address | Routing table within AS can be overridden by authority. | Block access to certain IP |
| TCP flow | Establish connection | TCP SYN/RST are in plain text and spoofed. Packet loss can trigger rate adjustment. Port # is associated with service types. | Block port Inject TCP RST Traffic shaping & policing |
| SSL/TLS | Secure connection | TLS hello is in plain text. SNI field has destination address. Hello can be profiled. | Detect destination using SNI field |
| HTTP GET | Request service | HTTP has host, type fields in plain text. | Detect service type & host from HTTP |
| App Server | Provide the contents | The search logic can be manipulated. | Block keywords Block links to contents |
| Adaptive code | Adjust service rate | Flow control can trick adaptive code to lower the service rate. | Inject packet losses for video connection |

Anatomy of traffic filtering: Layers

| | Protocol examples | Flow Type ID clues | Filterin method |
|---|---|---|---|
| L6,7: presentation, application, | HTTP, Bittorrent, HTTPS (SSL/TLS) DNS | URL (destination) Protocol type (Bittorrent) Text matching in protocol (type field in HTTP, SNI in HTTPS [1]) | Application proxy DNS redirection |
| L5: session | RPC, PPTP, SOCKS, ... | | |
| L4: transport L3: network | TCP, UDP, SCP, ... IP | Protocol type Port number DSCP (Diffserv) Destination/Source IP | shaping/policing Traffic manipulation (Inject TCP FIN, ...) block |
| L2: data link | PON, Ethernet | Traffic container (GPON) | Shaping/policing |

FIG. 1C

SYSTEMS AND METHODS FOR NET NEUTRALITY TESTING

The present disclosure claims priority to U.S. Provisional Patent Application No. 62/624,467, entitled, "SYSTEMS AND METHODS FOR NET NEUTRALITY TESTING," naming as inventor Chan-Soo Hwang, and filed Jan. 31, 2018, and claims priority to the 371 International Application No. PCT/US2019/014962, entitled, "SYSTEMS AND METHODS FOR NET NEUTRALITY TESTING" naming as inventors Chan-Soo Hwang, John M. Cioffi, Tuncay Cil, and filed on Jan. 24, 2019, which application is hereby incorporated herein by reference in its entirety.

BACKGROUND

A. Technical Field

The present disclosure relates generally to systems and methods for determining the performance of an internet network provided by an Internet Service Provider (ISP). More particularly, the present disclosure may relate to determining a net neutrality status of an internet network.

B. Background

Net neutrality is the principle that internet service providers (ISPs) must treat data on the Internet the same, and not discriminate or charge differently by user, content, website, platform, application, type of attached equipment, or method of communication. Under these principles, internet service providers are not allowed to intentionally block, slow, or charge money for specific websites and online content. Because discrimination can take many forms, detecting violations of net neutrality may be difficult.

Accordingly, what is needed are systems and methods that can efficiently and accurately determine if an ISP has discriminated against a certain subset of users or services and violated net neutrality.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 1B depicts anatomy of traffic filtering for timelines in an internet network according to embodiments of the present document.

FIG. 1C depicts an anatomy for traffic filtering in an internet network based on Open Systems Interconnection model (OSI model) layers according to embodiments of the present document.

FIGS. 3C and 3B depicts flowcharts for another method of detecting a net neutrality status according to other embodiments of the present document.

DETAILED DESCRIPTION OF EMBODIMENTS

Figure 1A:
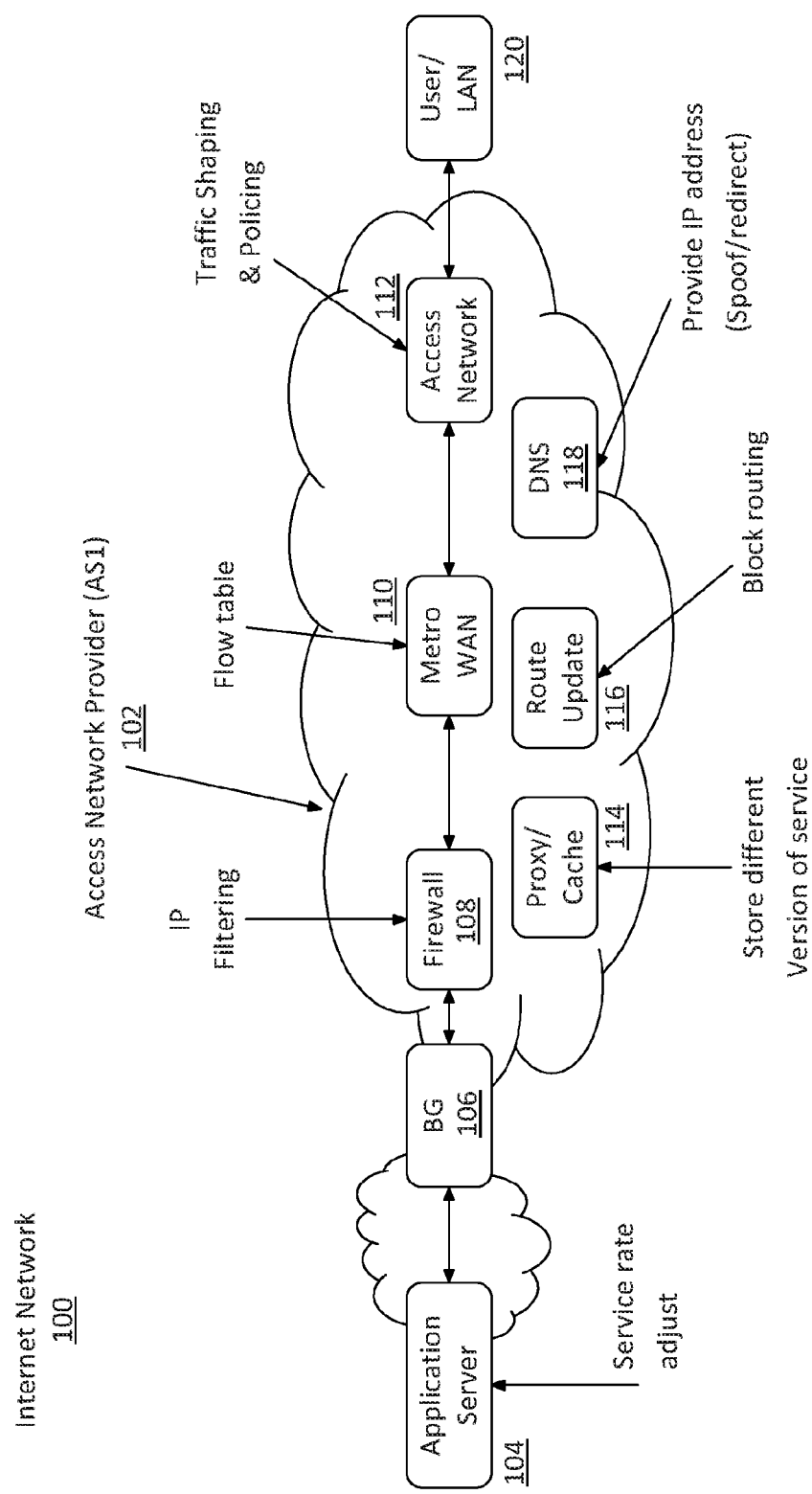
FIG. 1A depicts the anatomy for traffic filtering in different locations in an internet network according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Autonomous Systems (ASs)

An autonomous system (AS) may be a collection of connected Internet Protocol (IP) routing prefixes under the control of one or more network operators on behalf of a single administrative entity or domain that may present a common and clearly defined routing policy to an internet network. FIG. 1A depicts the anatomy of traffic filtering in different locations in an internet network according to embodiments of the present document. More specifically, FIG. 1A depicts an autonomous system, internet network 100, that comprises access network provider (AS1) 102, application server 104, and user/LAN 120. Access network provider (AS1) 102 illustrates the anatomy of traffic filtering and their location an internet network. Elements of traffic filtering may include: firewall 108 supporting IP filtering; Metro WAN 110, based on a flow table; access network 112, based on traffic shaping & policies; proxy/cache 114, which may store different version of service; route update 116, proving block routing; and DNS 118, providing IP address for spoof and redirect. (WAN—wide-area-network; DNS—domain name system). Application server 104 may implement service rate adjustments. Application server 104 may be coupled to the access network provider (AS1) 102 via BG 106. (BG—border gateway).

The anatomy of traffic filtering is further discussed in FIG. 1B. FIG. 1B depicts anatomy of traffic filtering: Timelines 140 for an internet network according to embodiments of the present document. FIG. 1C depicts an anatomy for traffic filtering: Layers 160 in an internet network based on Open Systems Interconnection model (OSI model) layers according to embodiments of the present document. Relative to the anatomy of traffic filtering for OSI layers: 1) Information that is located above L4 may be in the payload of TCP/IP PDU (packet), so deep packet inspection (DPI) may be required to determine the contents. 2) TCP port and IP address based flow-type discovery may be inaccurate due to virtual hosting and content distribution network (CDN), respectively. 3) Filtering may be applied per user (e.g., based on monthly usage), per time (e.g., busy/idle time).

B. Net Neutrality Detection System

Described herein are systems and methods that may determine a net neutrality status. A server and an agent of an internet network may each generate two flows of data that are transmitted/received by the server/agent, respectively. The first flow comprises an unspoofed data flow as may be transmitted over the network. In general, the first flow may comprise any data that would not be altered, which includes a web surfing data, mobile application data, file transfer data, VoIP data, audio streaming data, or pseudo random data. The second flow comprises a spoofed data flow. The second flow may emulate, or spoof, a video stream or other data flows that may be altered in the network. By comparing the received first flow relative to the second flow a difference in performance data may be obtained that can determine a neutrality status. Either the server or agent may measure the performance data of either the upstream flows or downstream flows. Generally, if a measurement command is invoked: the system starts a downstream measurement, then after completion of the downstream measurement; the system starts an upstream measurement, and waits until upstream measurement is completed. The net neutrality status is then determined. As used herein, performance data may be equivalent to performance parameter measurements.

The algorithm for net neutrality detection may comprise the following elements: 1) Agent/Server performs regular probing without spoofing, including Download/Upload speed, RTT, one-way delay, packet loss rate; 2) Agent/Server performs spoofed speed/RTT/loss-rate test; 3) Agent/Server compares the performance data to detect net-neutrality violation.

Figure 2:
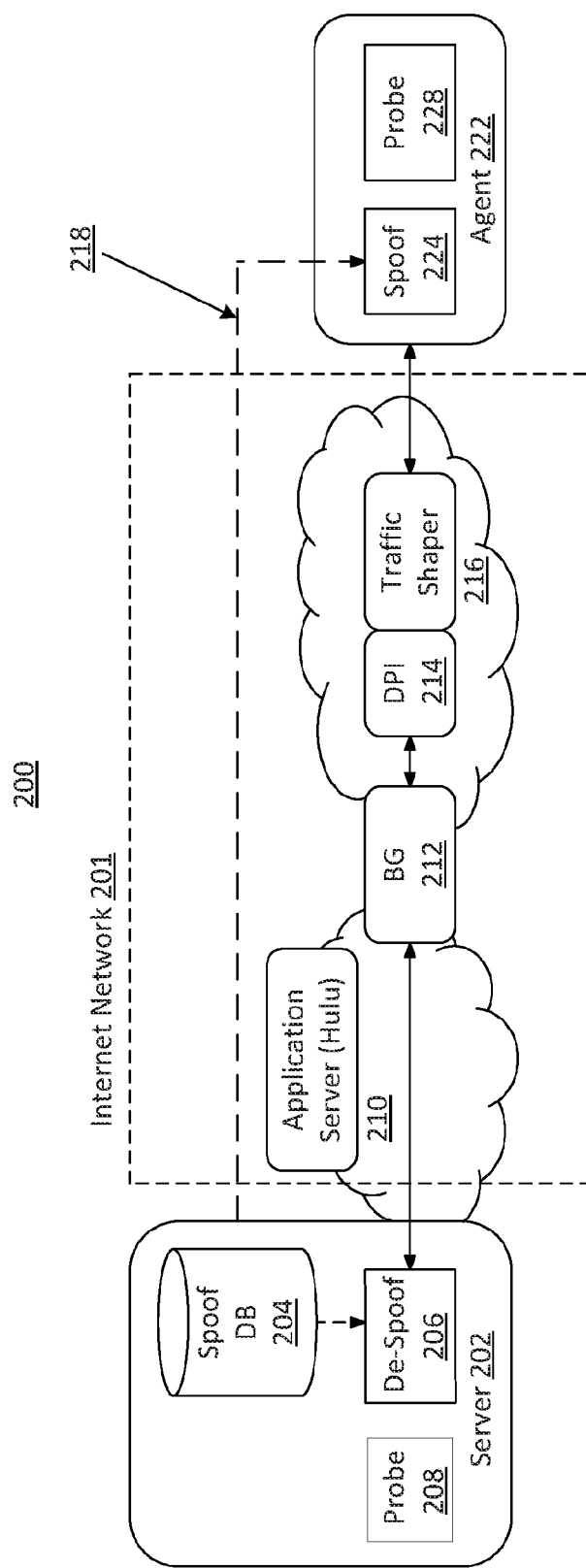
FIG. 2 depicts an internet network capable of detecting a net neutrality status according to embodiments of the present document.

FIG. 2 depicts a network 200 capable of detecting a net neutrality status according to embodiments of the present document. Network 200 illustrates an example of how to spoof utilizing HTTP GET command. Network 200 may utilize L7 spoofing. Network 200 may comprise an internet network 201, Server 202 and Agent 222. Agent 222 may be a gateway or a user device like a smart phone or mobile phone. Server 202 communicates with Agent 222 via an internet network 201. Server 202 may be an internet server, and may not be a video server. Server 202 may comprise spoof DB 204, probe 208 and De-Spoof 206. Spoof DB 204 may comprise a database of spoof algorithms describing different methods for spoofing. This database may be continually updated. Examples, but without limitations, of spoof algorithms utilized in traffic filtering are described in FIG. 1B. Probe 208 may be capable to measure performance parameters of a received flow of data.

Agent 222 may comprise spoof 224 and probe 228. Spoof 224 may generate a spoofed data flow from a data flow. Internet network 201 may also include application server (for example, Hulu.com) 210. Application server (for example, Hulu.com) 210 may not be required to obtain performance parameter measurements.

A Server 202 and Agent 222 may each generate two flows of data that may utilize HTTP GET commands. The first flow comprises an unspoofed data flow as may be transmitted over the network utilizing a HTTP GET command. In general, the first flow may comprise any data that would not be altered, which includes a web surfing data, mobile application data, file transfer data, VoIP data, audio streaming data, or pseudo random data. The second flow may comprise a spoofed data flow that may be determined by spoof DB 204. The second flow may emulate, or spoof, a video stream or other data flows that may be altered in the network. Within the HTTP GET command, specific header information may be embedded to spoof a video stream. For example, but without limitation, spoofing may cause a video stream to include content from Netflix.com instead of pseudo random data. Effectively the spoofed random data is packaged in the video stream of the second flow. Deep packet inspection (DPI) 214 examines the HTTP GET command and looks for known URL in the URL field to see if it matches a known application server. Or DPI 214 examines content type (MIME type) to see if it matches a known video stream type such as mpeg. MIME (Multi-Purpose Internet Mail Extensions) is an extension of the original Internet e-mail protocol that lets people use the protocol to exchange different kinds of data files on the Internet: audio, video, images, application programs, and other kinds, as well as the ASCII text handled in the original protocol, the Simple Mail Transport Protocol (SMTP). To spoof the data flow, the HTTP header can be updated to trigger DPI filtering. For example, URL field in the HTTP header can be updated to a known URL of known application server, such as hulu.com, even if the data flow contains pseudo-random data and even if the IP address of the flow is still the speed test server. In another example, the MIME field in the HTTP header can be updated to video stream while the IP address of the flow is still the speed test server. This spoofing method may be effective since HTTP GET is a layer 7 protocol and its URL address is not used for routing. Spoofing operation may be limited to higher layer protocols, for example L4 and above.

In a first step, Server 202 generates flow1 (unspoofed data flow) and flow2 (spoofed data flow). Subsequently, Server 202 transmits downstream flows, flow1 and flow2, over internet network 201. This communication link may include a border gateway (BG) 212 which in turn is coupled to deep packet inspection (DPI) 214 and traffic shaper 216. De-Spoof 206 may detect the unspoofed data flow from the spoofed data flow, i.e. De-Spoof 206 de-multiplexes the two flows. The data flows may be supported by a TCP protocol.

DPI 214 may include a complete packet inspection and information extraction. DPI 214 be a form of computer network packet filtering that examines the data part and possibly also the header of a packet as it passes an inspection point, searching for protocol non-compliance, viruses, spam, intrusions, or defined criteria to decide whether the packet may pass or if it needs to be routed to a different destination, or, for the purpose of collecting statistical information that functions at the Application layer of the OSI (Open Systems Interconnection model).

Traffic shaper 216 may be a bandwidth management function that delays some or all packets to bring them into compliance with a desired traffic profile. Traffic shaping may be used to optimize or guarantee performance, improve latency, or increase usable bandwidth for some kinds of packets by delaying other kinds.

After being processed by DPI 214 and traffic shaper 216, the downstream flows, Howl and flow2, are received by Agent 222. The performance data may be measured by Server 202 (transmitter) via probe 208. Alternatively, at Agent 222 (receiver), probe 228 may measure the performance data of the received flow1 and flow2. The performance data or performance parameter measurements may include 1) downstream/upstream speed, 2) round-trip time (RTT) 3) packet loss rate, 4) one-way delay, or 5) other Internet QoS metrics. Server 202/Agent 222 may measure speed by counting the number of successfully transmitted packets. The performance data can be measured by the transmitter when the transmission of measurement data uses a protocol that requires acknowledgement of reception. For example, TCP protocol requires the receiver to send a packet back to the transmitter upon the successful reception of the packet. By accounting the acknowledgement packets and transmission record, the transmitter can deduce the performance data such as throughput.

In a second step, Agent 222 generates and transmits flow3 (unspoofed data flow) and flow4 (spoofed data flow) over internet network 201. These upstream flows may be processed by deep packet inspection (DPI) 214 and traffic shaper 216, and may be coupled to BG 212, which in turn may be coupled to Server 202. The performance data may be measured by Server 202 (receiver) via probe 208. Alternatively, at Agent 222 (transmitter), Probe 228 may measure the performance data of flow3 and flow4.

The performance data may be analyzed to determine a net neutrality status. Server 202, via probe 208, may analyze and compare the differences between the measured performance data for flow1 relative to flow2 and flow3 relative to flow4. If the difference in the measured performance data between flow1 and flow2 are greater that a first threshold, and/or if the measured performance data between flow3 relative to flow4 are greater than a second threshold, there may be a net neutrality violation. On the other hand, if the differences between the measured performance data for flow1 relative to flow2 are less that a first threshold, and/or the measured performance data for flow3 relative to flow4 are less than a second threshold, the net neutrality status may be acceptable.

Alternatively, Agent 222, via probe 228 may analyze and compare the differences between the measured performance data for flow1 relative to flow2 and flow3 relative to flow4, in a similar manner to the process utilized for server 202. Agent 222, via probe 228 may determine the following: If the difference in the measured performance between flow1 and flow2 are greater that a first threshold, and/or if the measured performance data between flow3 relative to flow4 are greater than a second threshold, there may be a net neutrality violation. On the other hand, if the differences between the measured performance data for flow1 relative to flow2 are less that a first threshold, and/or the measured performance data for flow3 relative to flow4 are less than a second threshold, the net neutrality status may be acceptable.

For some embodiments of the present disclosure, either Server 202 or Agent 222 may measure the performance data of either the upstream flows or downstream flows. Either Server 202 or Agent 222 may then analyze the upstream (flow3, flow4) and downstream (flow1, flow2) measurements and differences. From this analysis, either Server 202 or agent 222 may determine whether there is a net neutrality violation or not.

In some embodiments, the spoofed and non-spoofed flows may be coupled through the exact same route at the exact same time using exact same protocol. For example, the aforementioned first step and second step can run at the same time to ensure concurrency. That is, the same IP address and port number can be used for both spoofed and non-spoofed flows. Without traffic shaping, both will equally share the bandwidth. Additionally, there may not be a need to change/collaborate with application server, i.e., Hulu versus Netflix. Also, spoof DB 204 may contain HTTP requests for potentially affected services (streaming video, music, and bittorrent). The method of spoofing may be continuously updated such that operators cannot interfere. Procedures include testing different port number, protocols, VPN, proxy.

In some embodiments, the upstream and downstream speed may not need to be measured at the same time. Generally, if a measurement command is invoked, the system starts a downstream measurement process. When the downstream measurement is finished, the system starts an upstream measurement process, and then waits until upstream measurement is completed. The net neutrality status is then determined. The order of upstream/downstream flow and measurements may not be important.

In some embodiments, spoofing may be implemented at L4, L5, L6 or L7. IP routing may be the same for all flows and may be implemented at layer 3 (L3). As previously noted, spoof DB 204 maintains a database of spoof algorithms which may be continually updated based on network activity and other sources. To build a database of spoofing algorithm, different type of services may be transmitted over the internet and the performance of the different services may be measured. When a type of service performs significantly lower than the other types, the lower performing services may be deemed as the traffic that would contain features that would trigger the alteration (filtering, throttling, and so on). Then, the header of such traffic can be used as an input to the spoofing algorithm database. In an embodiment, such traffic is used as the second flow. In addition, when a type of service performs better than others, the higher performing service may be deemed as the traffic that would not be altered; therefore, this service can be used as the first flow. These characteristics may insure that the net neutrality detection is "future proof". Spoof 224 of Agent 222 may access spoof algorithms from spoof DB 204 via a logical connection 218.

The spoof algorithm database can be built based on unsupervised learning process. The example of the learning process is as follows:

(1) The server and/or agent monitor the service performance of payload traffic without spoofing.

(2) If the performance of a certain payload traffic is worse than other payload traffic, record the packets.

(3) The server and/or agent runs network neutrality test while transmitting the recorded packets as spoofed data.

(4) If the performance of spoofed data is consistently worse than the performance of non-spoofed data, add the spoofed data to the spoofing database. Note that this comparison needs to be applied in many locations in the network and at different times, such that the confidence of traffic filtering is very high. Note that spoofing algorithm discovered in one network can be used in other network because many networks share the same network equipment with similar configurations. Note that the performance difference obtained in step (3) and (4) can be used as threshold for detecting the network neutrality violation.

The spoof algorithm database can be built based on supervised learning process. The example of the learning process is as follows:

(1) Server and agent are connected while at least one of the traffic filtering methods (for example one in FIG. 1B) is turned on.

(2) Server and/or agent measure the performance of a type of traffic that would be filtered by the traffic filtering method in Step (1).

(3) Server and/or agent measure the performance of a type of traffic that would not be filtered by the traffic filtering method in Step (1).

(4) Server and/or agent compare the performance measured in (2) and (3) and computes the performance difference. If the performance difference is significant, add the filtering method in Step (1) to spoof db. Note that the performance difference needs to be measured in many agents/servers as well as at different time so that the decision is confident. Note that the performance difference obtained in steps (2)-(4) can be used as threshold for detecting the network neutrality violation.

Another detection method may compare the performance from different ISPs, i.e., utilize a ratio of application performance/baseline performance as a metric. The spoof algorithm database can be built based on unsupervised learning process by comparing performance in two different networks. The example of the learning process is as follows:

(1) The server and/or agents monitors the service performance of payload traffic at least two different networks. For example, a server can monitor the service performance with two agents located at different access networks.

(2) If the difference of performance of a certain payload traffic at different networks is larger than the other traffic types, record the packets that caused the large performance difference. For example, let's assume that the average video speed at Network A and B is 4 Mbps and 10 Mbps; average web-browsing speed is 8 Mbps and 10 Mbps; and average video conferencing speed is 6 Mbps and 8 Mbps. Then, the video speed difference is 6 Mbps, which is greater than the speed difference of video conferencing or web-browsing. Then, the system records the packets for video streaming at Network A. Note that the difference can be measured by ratio or difference or any combination of many performance metrics.

(3) The server and/or agents run network neutrality test while transmitting the recorded packets as spoofed data. For example, the video streaming in (2) can be used as spoofed data and server and agent in Network A in (2) can use the spoof data to measure the network performance. To get better confidence, the same measurement can be performance between the server and agent in Network B.

(4) If the performance of spoofed data is consistently worse than the performance of non-spoofed data, add the spoofed data to the spoofing database. Note that the performance difference obtained in step (3) and (4) can be used as threshold for detecting the network neutrality violation.

In summary, a server may be coupled to an agent via an internet network, wherein the server comprises a probe capable of measuring performance parameters of a flow of data, and a database of spoof algorithms. The agent may compromise a spoof function and another probe of measuring performance parameters of another flow of data; and the internet network comprising a border gateway (BG) which is coupled to a deep packet inspection (DPI) and a traffic shaper. The server and the agent each generate an unspoofed data flow and a companion spoofed data flow for upstream data flows and downstream data flows, respectively, and by determining a difference between an upstream unspoofed data flow and its companion upstream spoofed data flow to a first threshold, or by determining a difference between a downstream unspoofed data flow and its companion downstream spoofed data flow to a second threshold, a net neutrality status may be determined. If the difference between the upstream unspoofed data flow and the companion upstream spoofed data flow is less than the first threshold, or if the difference between the downstream unspoofed data flow and the companion downstream spoofed data flow is less than the second threshold, the net neutrality status is acceptable.

C. Net Neutrality Detection Methods

First Method

Figure 3A:
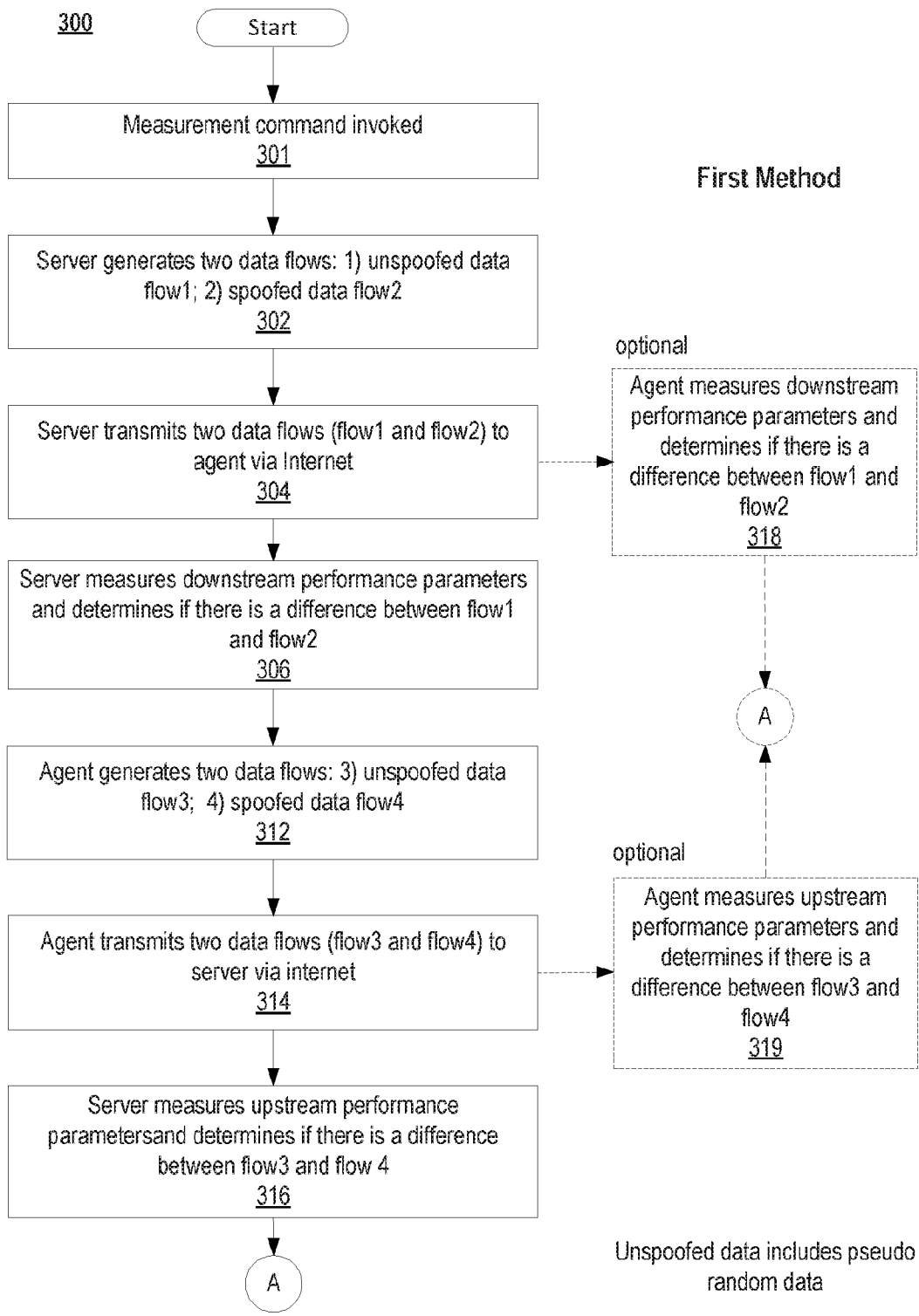
FIG. 3A and FIG. 3B depicts flowcharts for a method of detecting a net neutrality status according to embodiments of the present document.
Figure 3B:
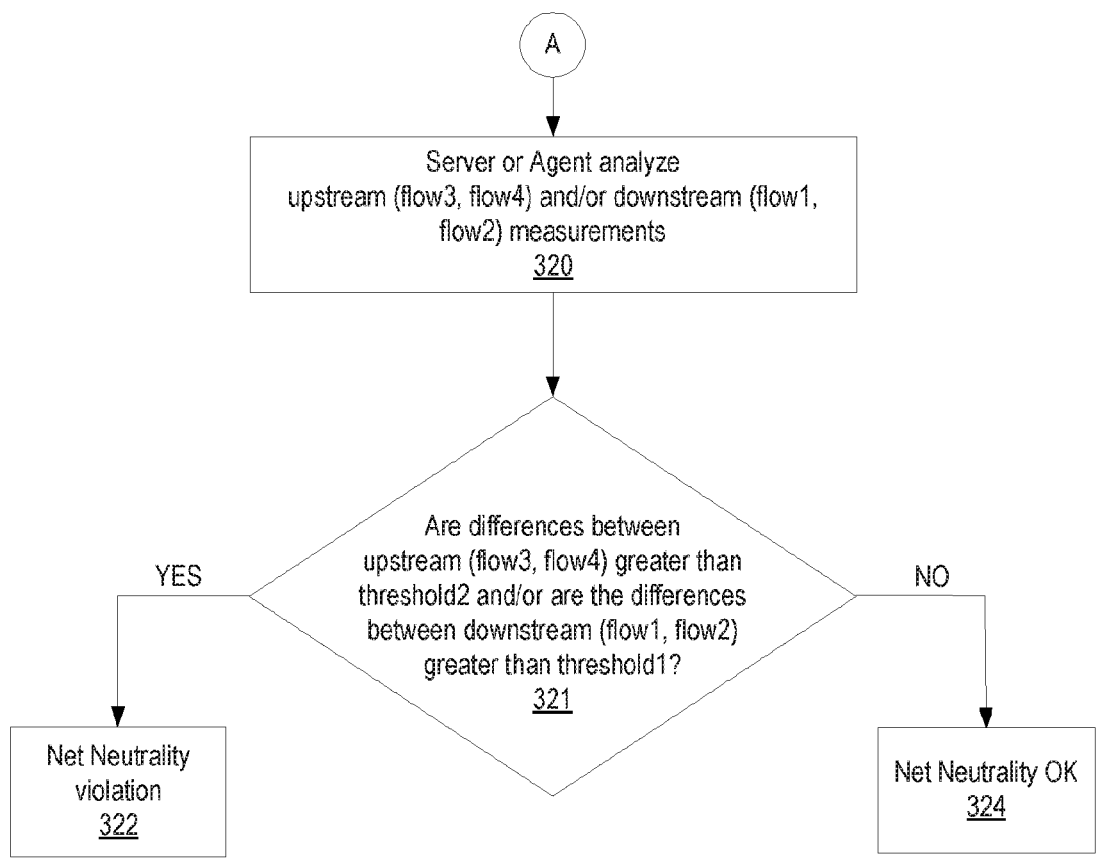

FIGS. 3A and 3B depicts flowcharts 300 and 340, respectively, for detecting a net neutrality status according to embodiments of the present document. The method may measure downstream and upstream data flows sequentially. The method comprises the steps of:

Starting by invoking a measurement command by a server or an agent. (step 301)

Server generates two data flows: 1) unspoofed data flow1; 2) spoofed data flow2. Spoofing may be implemented at L4, L5, L6 or L7. (step 302).

Server transmits two data flows (flow1 and flow2) to agent via an internet network. (step 304).

Server measures downstream speed or other performance parameters and determines if there is a difference between flow1 and flow 2. Performance parameters may include measuring downstream speed by counting number of successfully transmitted packets, round-trip time (RTT) packet loss rate, one-way delay, or other Internet QoS metrics (step 306). As previously discussed, the performance data can be measured by the transmitter when the transmission of measurement data uses a protocol that requires acknowledgement of reception. For example, TCP protocol requires the receiver to send a packet back to the transmitter upon the successful reception of the packet. By accounting the acknowledgement packets and transmission record, the transmitter can deduce the performance data such as throughput Agent generates two data flows: 1) unspoofed data flow3; 2) spoofed data flow4. Spoofing may be implemented at L4, L5, L6 or L7. (step 312).

Agent transmits two data flows (flow3 and flow4) to server via internet network. (step 314).

Server measures upstream speed or other performance parameters and determines if there is a difference between flow3 and flow 4. Performance parameters may include measuring upstream speed by counting number of successfully transmitted packets, round-trip time (RTT) packet loss rate, one-way delay, or other Internet QoS metrics. (step 316).

Server or agent analyze upstream (flow3, flow4) and/or downstream (flow1, flow2) measurements. (step 320).

Are the differences in performance parameter measurements between upstream flow3 and flow4 greater than threshold2 and/or are the differences in performance parameter measurements between downstream flow1 and flow2 greater than threshold1? (step 321)

If yes, then there may be a net neutrality violation. (step 322)

If no, then the net neutrality status is acceptable, i.e. net neutrality OK. A downstream net neutrality status may be determined by measuring, by the server or agent, downstream performance parameters and determining if there is a difference between the first flow and the second flow. An upstream net neutrality status may be determined by measuring, by the server or agent, upstream performance parameters and determining if there is a difference between the third flow and the fourth flow. (step 324)

Optionally, Agent measures downstream speed or other performance parameters and determines if there is a difference between flow1 and flow2. Measured data is input to step 320. (step 318)

Optionally, Agent measures upstream speed or other performance parameters and determines if there is a difference between flow3 and flow4. Measured data is input to step 320. (step 319)

Relative to steps 302 and 312, data flows may not need to be generated for every measurement. In some embodiment, the server/agent may save a measurement file which an agent/server may download at a later time. That is, the server and agent may store their generated data flows in a time period and the server and agent transmit their stored data flows in another time period. In other embodiments, the server or agent measure upstream and downstream data flows sequentially. Relative to steps 304, in most speed test programs, a server may transmit downstream packets to an agent because the agent issued a HTTP GET command. The server packet transmission (downstream) is equivalent to the agent's download.

Second Method

Figure 3C:
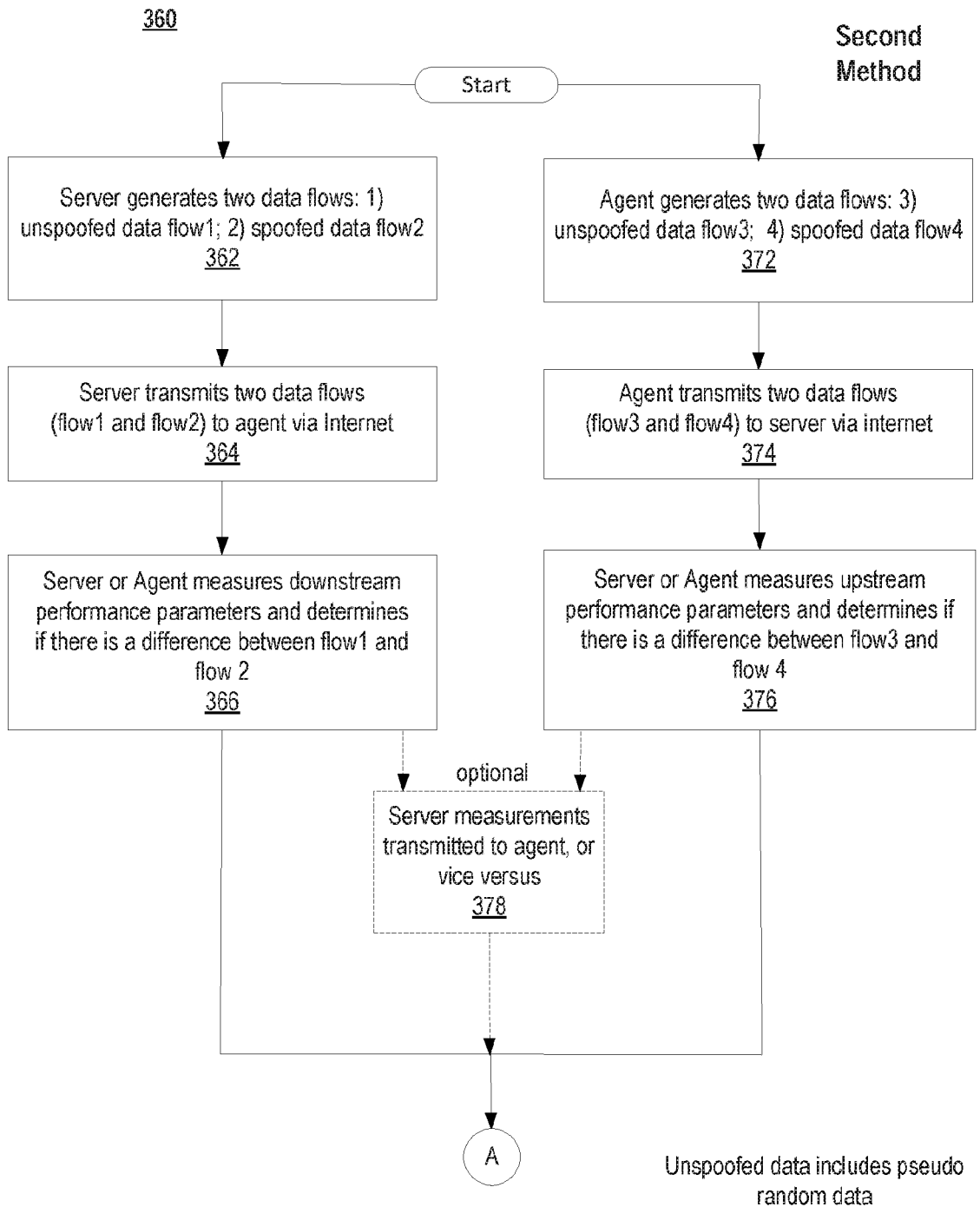

FIGS. 3C and 3B depict flowcharts 360 and 340, respectively, for detecting a net neutrality status according to other embodiments of the present document. The method may measure downstream and upstream data flows simultaneously. The downstream and upstream measurements are executed simultaneously because some filtering/throttling may be triggered only if both upstream and downstream traffic patterns match a certain type of traffic. Traffic filtering is described in FIG. 1B and FIG. 1C. The method comprises the steps:

Starting by invoking a measurement command by a server or an agent.

Server generates two data flows: 1) unspoofed data flow1; 2) spoofed data flow2. Spoofing may be implemented at L4, L5, L6 or L7. (step 362).

Server transmits two data flows (flow1 and flow2) to agent via an internet network. (step 364).

Server or Agent measures performance parameters and determines if there is a difference between flow1 and flow 2. Performance parameters may include measuring downstream speed by counting number of successfully transmitted packets, round-trip time (RTT) packet loss rate, one-way delay, or other Internet QoS metrics (step 366).

Agent generates two data flows: 1) unspoofed data flow3; 2) spoofed data flow4. Spoofing may be implemented at L4, L5, L6 or L7. (step 372).

Agent transmits two data flows (flow3 and flow4) to server via internet network. (step 374).

Server or Agent measures performance parameters and determines if there is a difference between flow3 and flow 4. Performance parameters may include measuring downstream speed by counting number of successfully transmitted packets, round-trip time (RTT) packet loss rate, one-way delay or other Internet QoS metrics (step 376).

Optionally, Server measurements are transmitted to Agent and/or vice versa. (step 378)

Server or agent analyze upstream (flow3, flow4) and/or downstream (flow1, flow2) measurements. (step 320)

Are the differences in performance parameter measurements between upstream flow3 and flow4 greater than threshold2 and/or are the differences in performance parameter measurements between downstream flow1 and flow2 greater than threshold1? (step 321)

If yes, then there may be a net neutrality violation. (step 322)

If no, then the net neutrality status is acceptable, i.e. net neutrality OK. A downstream net neutrality status may be determined by measuring, by the server or agent, downstream performance parameters and determining if there is a difference between the first flow and the second flow. An upstream net neutrality status may be determined by measuring, by the server or agent, upstream performance parameters and determining if there is a difference between the third flow and the fourth flow. (step 324)

Relative to steps 362 and 372, data flows may not need to be generated for every measurement. The server/agent may save a measurement file which an agent/server may download at a later time. Relative to steps 364, in most speed test programs, a server may transmit downstream packets to an agent because the agent issued a HTTP GET command. The server packet transmission (downstream) is equivalent to the agent's download.

D. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, pamphlet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
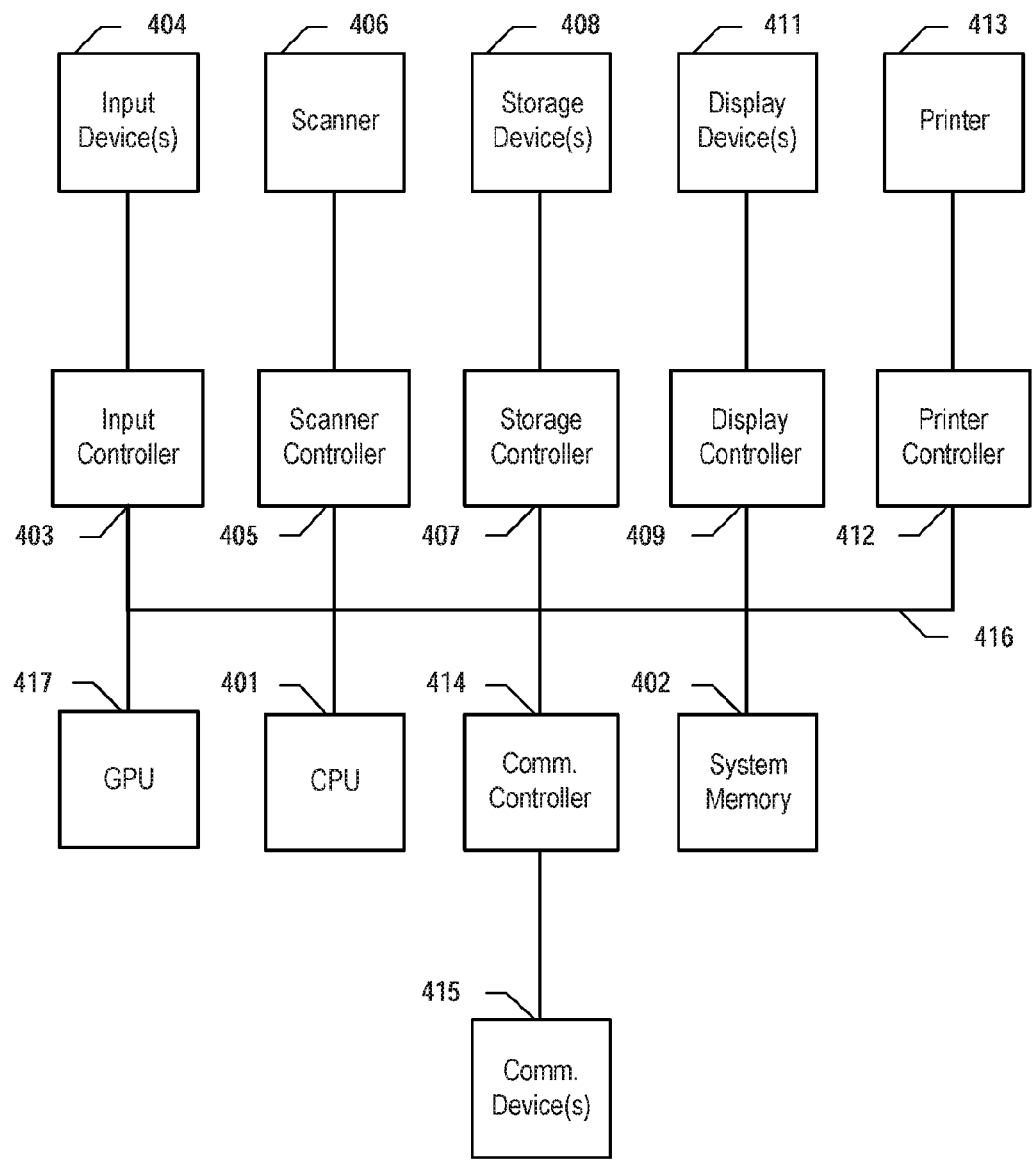
FIG. 4 depicts a simplified block diagram of a computing device/information handling system, in accordance with embodiments of the present document.

FIG. 4 depicts a simplified block diagram of a computing device/information handling system (or computing system) according to embodiments of the present disclosure. It will be understood that the functionalities shown for system 400 may operate to support various embodiments of an information handling system—although it shall be understood that an information handling system may be differently configured and include different components.

As illustrated in FIG. 4, system 400 includes one or more central processing units (CPU) 401 that provides computing resources and controls the computer. CPU 401 may be implemented with a microprocessor or the like, and may also include one or more graphics processing units (GPU) 417 and/or a floating point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, or stylus. There may also be a scanner controller 405, which communicates with a scanner 406. System 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present invention. Storage device(s) 408 may also be used to store processed data or data to be processed in accordance with the invention. System 400 may also include a display controller 409 for providing an interface to a display device 411, which may be a cathode ray tube (CRT), a thin film transistor (TFT) display, or other type of display. The computing system 400 may also include a printer controller 412 for communicating with a printer 413. A communications controller 414 may interface with one or more communication devices 415, which enables system 400 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method comprising:
invoking a measurement command by a server or an agent;
generating, by the server, a first flow comprising unspoofed data and a second flow comprising spoofed data, wherein the server maintains a database of spoof algorithms that are updated based on measured performance of different services;
transmitting downstream, by the server, the first flow and the second flow via an internet network to the agent;
determining a downstream net neutrality status by measuring, by the server or agent, downstream performance parameters and determining if there is a difference between the first flow and the second flow, wherein, the downstream net neutrality status is acceptable if the difference between the first flow and the second flow is not greater than a first threshold, and the upstream net neutrality status is acceptable if the difference between a third flow and a fourth flow is not greater than a second threshold.

2. The method of claim 1, wherein, unspoofed data comprises data that is not altered by an Internet Service Provider.

3. The method of claim 2, wherein unspoofed data comprises web surfing data, mobile application data, file transfer data, VoIP data, audio streaming data, or pseudo random data.

4. The method of claim 1, wherein,
the server and agent store their generated data flows in a time period and the server and agent transmit their stored data flows in another time period.

5. The method of claim 1, wherein,
the server or agent measure downstream data flows sequentially.

6. The method of claim 1, wherein unspoofed data flows and spoofed data flows utilize HTTP GET commands.

7. The method of claim 1, wherein the upstream and downstream performance parameters comprise measuring speed by counting number of successfully transmitted packets, round-trip time (RTT) packet loss rate, one-way delay.

8. The method of claim 1, wherein spoofed data comprises data altered by the internet network and implemented at layer 4, layer 5, layer 6 or layer 7.

9. The method of claim 1, wherein the spoofed data is packaged in a video stream of the second flow or the fourth flow.

10. A method comprising:
invoking a measurement command by a server or an agent;
generating, by the server, a first flow comprising unspoofed data and a second flow comprising spoofed data, wherein the server maintains a database of spoof algorithms that are updated based on measured performance of different services;
transmitting, by the server, the first flow and the second flow via internet to the agent;
measuring, by the server or agent, downstream performance parameters and determining if there is a difference between the first flow and second flow;
generating, by the agent, a third flow comprising unspoofed data and a fourth flow comprising spoofed data;
transmitting, by the agent, the third flow and the fourth flow via internet to the server;
measuring, by the server or agent, upstream performance parameters and determining if there is a difference between the third flow and fourth flow; and
determining, by the server or agent, if either the difference between the first flow and second flow is greater than a first threshold, or determining if the difference between the third flow and fourth flow is greater than a second threshold.

11. The method of claim 10 wherein, a net neutrality status is acceptable if either the difference between the first flow and second flow is not greater than the first threshold, and the difference between the third flow and fourth flow is not greater than the second threshold.

12. The method of claim 10, wherein, a net neutrality status is not acceptable if either the difference between the first flow and second flow is greater than the first threshold, or the difference between the third flow and fourth flow is greater than the second threshold.

13. The method of claim 10, further comprising:
executing the upstream measurements and the downstream measurements simultaneously.

14. A system comprising:
a server coupled to an agent via an internet network, wherein the server comprises a probe capable to measure performance parameters of a flow of data, and a database of spoof algorithms that are maintained by the server and updated based on measured performance of different services;
the agent comprising a spoof function and another probe capable to measure performance parameters of another flow of data; and
the internet network comprising a border gateway (BG) which is coupled to a deep packet inspection (DPI) and a traffic shaper,
wherein the server and the agent each generate a unspoofed data flow and a companion spoofed data flow for upstream data flows and downstream data flows, respectively, and
wherein, by determining a difference between an upstream unspoofed data flow and its companion upstream spoofed data flow to a first threshold, or by determining a difference between a downstream unspoofed data flow and its companion downstream spoofed data flow to a second threshold, a net neutrality status is determined.

15. The system of claim 14, wherein if the difference between the upstream unspoofed data flow and the companion upstream spoofed data flow is less than the first threshold, or if the difference between the downstream unspoofed data flow and the companion downstream spoofed data flow is less than the second threshold, the net neutrality status is acceptable.

16. The system of claim 14, wherein unspoofed data flows and spoofed data flows utilize HTTP GET commands.

17. The system of claim 14, wherein the internet network further comprises an application server.

18. The method of claim 1, wherein the database of spoof algorithms has been built using at least one of a supervised or non-supervised machine learning process.

* * * * *